3,241,974
METHOD OF MINIMIZING WEIGHT LOSS IN ANIMALS DURING TRANSPORTATION, SLAUGHTER AND AGING
Rudolph Seiden, Kansas City, Mo., assignor to Haver-Lockhart Laboratories, Incorporated, Kansas City, Mo., a corporation of California
No Drawing. Filed July 24, 1963, Ser. No. 297,194
10 Claims. (Cl. 99—2)

This application is a continuation-in-part of application Serial No. 16,200, filed March 21, 1960, now abandoned, and application Serial No. 163,853 filed January 2, 1962, now abandoned, all having the same title.

This invention relates to a novel method of increasing the tenderness and customer acceptability of food products obtained from meat producing animals, and in particular to a process of assuring maximum juiciness of that part of the flesh of meat producing animals generally designed as muscle tissue. Maximum juiciness and thereby tenderness of the meat has been found to be obtained by causing the individual cells of the tissue to be filled to the maximum with water at the time of slaughter of the animal, notwithstanding the fact that such animal has been subjected to considerable stress during transportation to market. It has been demonstrated that any dehydration of the tissue cells prior to slaughter of the animal has a deleterious effect not only on the tenderness of the meat product obtained therefrom, but also on customer acceptability as to appearance of the meat.

The body water of all animals is divided between the intracellular and extracellular compartments, the latter in turn being subdivided between interstitial and intravascular spaces. During marketing of meat producing animals and wherein it is generally necessary to haul the animals from the point of feeding of the same to a slaughter plant, body weight losses normally occur which ultimately have an adverse effect on the quality of meat products obtained from the animal carcasses. Loss in body weight is primarily attributable to disturbing influences and events which upset the animals during transportation thereof. Loading, unloading, jostling about in a moving truck or rail car, change of environment and different handlers produce nervous disturbances in the animals which result not only in what is generally termed "belly" shrink, but also tissue shrink as well. Tissue shrinkage is caused by loss of water from the cellular compartments of the muscles with the greatest loss of cellular water apparently being the result of improper ion balance between the cellular fluid and the extracellular fluid. Since body fluids contain inorganic salts dissociated into ions, the type and concentration of which differs between the intracellular fluid and the extracellular fluid, it can be recognized that these ions play an important part in flow of fluids through the cell walls and maintenance of a maximum quantity of water in individual cells. The stresses on meat producing animals during marketing of the same causes an imbalance of the ions in the cellular compartments as well as the extracellular fluid, thus causing loss of water from the cells and resulting in tissue shrinkage which materially affects the quality of the meat.

The intracellular fluid of the animals contains mainly potassium, magnesium and sodium (and possibly a small amount of calcium) as cations, and phosphate, sulfate, bicarbonate and protein as anions. Extracellular fluid likewise contains sodium, potassium and magnesium as cations along with an additional cation, calcium, and chloride, bicarbonate, phosphate, sulfate, organic acids and protein as anions. Except for protein both the interstitial and intravascular fluids of the extracellular compartments contain the same ions in similar proportions. It is known that each fluid compartment has a different osmotic pressure which is one of the main factors governing rapid and continuous passage of fluids from one compartment to another. When the cells of the animal are full, the osmotic forces are in equilibrium and the constant interchange of fluids preserves the basic fluid and electrolyte pattern of each compartment.

The membrane of each cell is highly permeable to water, but such membrane is selectively permeable to electrolytes with some of the ions passing more readily through the cell wall than other electrolyte ions. Thus the relative amounts of the different cations present in the intracellular fluid are controlled by the characteristics of the transport system for the ions with the ionic composition of the cells varying over relatively wide limits controlled primarily by the water content and the ionic composition of the extracellular fluid surrounding the individual cells of the muscle tissue. From this premise, it can be recognized that in order for the cell to maintain its proper activity, it is necessary that a sufficient amount of the different ions normally found in the extracellular fluid be present therein at maximum concentrations since the amount of water retained in the cell is in large measure determined by the optimum amount of ions in the cell which is the result of a proper balance of ions between the intracellular and extracellular fluids. Although an excess of one or more of the ions normally present in the extracellular fluid may cause a temporary imbalance of the ions in the extracellular fluid, the animal's system is capable of rapidly excreting these excess ions and thereby having little if any effect on the intracellular fluid.

Thus the electrolytes and especially sodium, potassium, magnesium, calcium and bicarbonate ions play an extremely important role in the animal's body and the physical state of its tissues which are utilized for food purposes. When the concentrations of the critical ions in the extracellular fluid falls below a normal physiological value, then water moves very quickly out of the intracellular compartments in an effort to reestablish osmotic equilibrium. Thus, it follows that if the principal ions normally present in the extracellular fluid are maintained at normal or temporarily higher concentrations, then then cells of the animal's tissue will be completely filled with water resulting in more tender and juicier meat than if the cells of the animal's body are depleted of some of the normal water, at the time of slaughter of the animal.

The sodium, potassium, magnesium, calcium and bicarbonate ions present in the animal's extracellular fluid are also of significance in regulating the exchange of nutrients and waste materials between cells and tissue fluids, and various disease conditions can actually result if these critical ions are low or below normal concentration in the extracellular fluid. Furthermore, a close interrelationship exists between the ions and hormones found in the body which control functioning of muscles, nerves and other important body mechanisms. Although the whole physiological picture is very complex and many of the problems relating thereto are still unsolved, it has now been determined that the quality of meat products can be improved materially by furnishing the animals with a specified diet containing certain electrolytes, during a selected period prior to slaughter of the animals.

It is therefore the primary object of the present invention to provide a novel method of increasing the tenderness and cutomer acceptability of food products obtained from meat producing animals by supplying such animals with a special diet for a predetermined period immediately prior to slaughter of such animals. It is an equally important object to provide an improved method as defined, wherein the diet supplied to the animals includes a selected number of electrolytes in proportions such that the ions normally present in the intracellular fluid of the animals' bodies tend to remain in proper concentration therein, regardless of the stresses under which the animals are placed, to thereby preclude alteration of the osmotic pressure between the intracellular and extracellular fluids in the animals' systems in a direction that would produce shrinkage of the tissue of the animals and thereby decrease the tenderness and juiciness of the meat products obtained from the animal carcasses.

It is also an important object of the invention to provide a method of increasing the tenderness and customer acceptability of food products obtained from meat producing animals, wherein the necessary electrolytes and in sufficient quantities may be readily supplied to the animals for the predetermined period immediately prior to slaughter thereof, by incorporating the critical electrolytes into either the food or water for the animals or in lick salt if the method is being applied to cattle and sheep. In this respect, it should be noted that the instant process is equally applicable to all types of meat producing animals including cattle, sheep, goats, swine and poultry.

An additional important object of the instant invention relates to the provision of a method as described which is effective in decreasing tissue shrinkage of the animals during marketing thereof independently of the distance such animals are transported, and without causing any adverse side reactions traceable to an attempt to maintain the animals in an unstressed condition throughout the handling thereof immediately prior to slaughter of the same.

It is another important object of the invention to provide a method of increasing the tenderness and juiciness of meat products which does not conflict with or in any way preclude utilization of compositions and procedures for maintaining the animals in a tranquil condition during marketing thereof, if this is deemed desirable or necessary for a particular lot of animals.

Many attempts have been made in the past to increase the tenderness of meat products but most of the same have involved material placed on the meat immediately prior to or during cooking thereof or, in the alternative, cooking the meat in a special way as under steam pressure or the like. These processes have inherent disadvantages resulting in change in flavor of the meat, destruction or decrease in such flavor, material alteration of the size of the meat after cooking of the same as compared with the fresh piece of meat, and change in color of the meat at the time of marketing thereof. Tenderizing additives suffer from the defect of leaving unpleasant aftertastes and also require considerable work on the park of the cook in an effort to cause the tenderizer to completely permeate and break down the connective fibers of the meat product.

The present invention involves feeding the meat producing animals a special diet for a predetermined period immediately prior to slaughter thereof in order to assure maximum tenderness of the meat without decreasing customer acceptability of the products, and substantially precluding the necessity of treating the meat after butchering of the animals to produce a product of desirable tenderness. The special diet supplied to the animals includes a preselected number of electrolytes in preferred relative proportions and is designed to maintain at least a proper balance of the ions in the extracellular and thereby the ion concentration of the intracellular fluids of the animals' bodies whereby the cells of the animals' flesh are maintained in a condition completely filled with water at the time of butchering of such animals and thus resulting in a final met product of maximum juiciness which is related to tenderness of the meat upon cooking thereof.

The ratio of ions in the blood serum of the animals has been demonstrated to be extremely important from a physiological standpoint; it is almost identical in composition and concentration to the ions found in sea water, the origin of all living organisms. There exists also a close relationship between animal and plant life, one depending directly or indirectly on the other. The mineral content of plants can vary widely depending upon a number of external factors in addition to fertilizing materials which are placed on the soil where the plants are grown. Herbivorous animals in particular take into their systems varying amounts of minerals, and especially electrolytes, depending upon the type of feed which the animals receive, the location where such feed was grown, the availability of trace elements in the soil and thereby the plants grown on such soil, water and other less significant conditions. Most meat producing animals raised for food purposes receive sufficient amounts of minerals, particularly sodium chloride, in feed, drinking water and as lick salt. The sodium and chloride ions, which are normally present in excess, are eliminated by healthy animals via their kidneys, and thus the excess salt will cause the animals to drink more water than needed only for the period during which the sodium and chloride ions remain in excess. By the same token, the water surplus caused by intake of more water than needed is rapidly excreted and has, if any, little and then only temporary effect on the condition of the intracellular fluids with respect to whether such cells of the animals' tissue are completely filled with water.

Although the available sodium ions may be present in required quantities or even in surplus, a very small deficiency of one or other of the required mineral ions of the electrolyte group necessary for the well-being of the animal will cause an ionic imbalance resulting in a change in the composition of both the extracellular fluid (plasma and interstitial) and the intracellular fluid. The ionic imbalance changes the osmotic pressure and water content of both the extracellular and intracellular compartments, and the cells become partly depleted of water.

Therefore, it is theorized that a healthy tissue cell containing the maximum quantity of water must contain all of the required electrolytes in properly balanced proportions and at threshold levels. In other words, all of the necessary ions must be present in the extracellular and intracellular fluids, and such ions must be available in the extracellular fluids in certain concentrations with reference to the intracellular ions so that the individual cells will retain an optimal amount of water over a prolonged period of time. The cellular fluid, which is in fact more voluminous than the extracellular fluid and therefore even more important than the fluid outside of the cells, is not accessible and for this reason it is required that the extracellular fluid be carefully maintained in a condition with the ions normally present therein at physiological maximums, so that the intracellular fluid will also contain the optimal amounts of ions therein which in turn affect the osmotic pressures between the intracellular and extracellular fluids on opposite sides of the cell membranes to prevent dehydration of the cells. It can be recognized that maintenance of the cells in a condition containing a maximum quantity of water is important in assuring optimal body weight of the animal under any given circumstances, and also to assure maximum resistance of the animal to stress conditions encountered during shipment and other handling operations immediately prior to slaughter of such animals.

Water alone, sodium chloride alone or a salt mixture having an insufficient amount of the required electrolytes therein or, in fact, not containing the required electrolyte compounds in admixture, when used alone, cannot prevent or overcome any degree of dehydration of an animal, particularly dehydration of the cells of the animal's tissues, except for temporary intervals. Certain critical electrolytes must be made available to the animals in concentrations to maintain the corresponding intracellular ions at their maximum physiological values. The administration of the electrolytes is to supply the animals with drinking water or feed containing a selected number of electrolyte compounds in necessary relative concentrations, or to incorporate the balanced electrolyte formulation into lick salt if feeding of ruminants is involved. Only an electrolyte composition containing sufficient amounts of the critical electrolytes, which are administered to the animals at required levels, can keep the extracellular and intracellular fluids of the animals' tissues at maximum levels for a prolonged period of time and particularly during transportation of the animals to the point of slaughter thereof. As previously stated, maintenance of the tissue cells in a completely water-filled condition will result in meat products from the slaughtered animals of maximum juiciness and visual appeal.

The preferred electrolyte composition to be supplied to the meat producing animals for a predetermined period immediately prior to slaughter thereof includes the critical potassium, magnesium and calcium ions as well as sodium and bicarbonate ions. It should be emphasized at this juncture that since the animals normally receive a quantity of sodium chloride in their diet, both from lick salt and from the salt present in the commercial and natural feeds fed to such animals, sodium chloride may be eliminated from the present electrolyte composition which is administered to the animals, if it can be ascertained that the required amount of sodium chloride is being supplied to the animals through other means. Also, the bicarbonate ions do not play as important a role as the potassium, magnesium and calcium ions in maintaining the ions in the intracellular fluid at peak physiological levels.

Although short administration periods of one day may be beneficial, best results are obtained in accordance with the present method by supplying the animals with the defined electrolyte composition for at least three days immediately before slaughter of the same, and preferably for a period of five days or longer. A formulation of preferred constituency may be provided by admixing:

| | Parts by wt. |
|---|---|
| Sodium chloride | 40 |
| Potassium chloride | 16.3 |
| Magnesium carbonate | 1.3 |
| Calcium lactate | 9.0 |

In order to assist formulation of the electrolyte composition, and to decrease the tendency of the same to cake, and additionally to expedite handling of the material both from a packaging standpoint and by the ultimate user, a composition of preferred constituency may be formed of the following compounds expressed as percentage by weight:

| | Percent |
|---|---|
| Sodium chloride | 40.0 |
| Potassium chloride | 16.3 |
| Magnesium carbonate | 1.3 |
| Calcium lactate | 9.0 |
| Sugar | 32.4 |
| Santocel C (inert anti-caking agent) | 1.0 |

The proportions of the ingredients set forth above are selected to provide a balanced electrolyte composition to be fed to the animals during the defined 3 to 5 day period with it being remembered that the electrolyte formulation is supplied to the animals for oral intake. It is theorized that when the electrolytes are admixed in the stated proportions and then introduced into the gastrointestinal tract of an animal, the sodium, potassium, magnesium, calcium, chloride and bicarbonate ions are absorbed into the extracellular fluid or plasma of the animal's system in proper ratios to maintain the ions in the animal's extracellular and intracellular fluids at optimal physiological levels.

Literature references normally indicate that the concentration of ions in the extracellular fluid of an animal generally may be expressed as follows:

| | Meq./l. |
|---|---|
| Sodium | 142 |
| Potassium | 5 |
| Calcium | 5 |
| Magnesium | 3 |
| Chloride | 103 |
| Bicarbonate | [1] 52 |

[1] Equivalent value obtained from lactate and carbonate radicals.

While the sodium ion is the most abundant in the extracellular fluid, it is greatly reduced in the intracellular fluid where the potassium ion is by far the most important ion, amounting to a multiple of the sodium ions expressed in milliequivalents. The magnesium content, expressed in milliequivalents, is almost as high as the content of the sodium ion.

Therefore it is understandable that a lack of sufficient potassium in the extracellular fluid will show up in increased proportions in the intracellular fluid. Since potassium is not normally added to feed, feed supplements, or trace element mixtures, animals will not receive the optimum amounts of potassium. It is known that for dehydration, so-called "maintenance solutions" are injected which are relatively lower in sodium and higher in potassium ions than the normal replacement electrolyte solutions which are compounded so as to conform to the composition of ions in the extracellular fluid. This is done to counteract the deficiency of the intracellular ions, particularly the potassium deficiency; the other ions, calcium and magnesium play a relatively less important role. It has been found that the oral administration of such compounds is indicated as a supplement to feed to make sure that the cells will under all practical conditions, contain the optimum amounts of the potassium and other ions to insure optimum water content.

Although best results are believed obtained when the electrolyte composition includes potassium, magnesium and calcium ions in addition to sodium ions, it has been determined that prevention of dehydration of the animals' cells can be obtained to an important extent by supplying the animals with a composition including potassium ions alone, with potassium and magnesium ions, or with potassium, magnesium and calcium ions. In all cases however, sufficient quantities of the critical cations must be supplied to the animals immediately prior to and during the period of stress, to prevent loss of these cations from the intracellular fluid which can result in cell dehydration and loss of body weight.

Thus the electrolytes in the preferred formulation above have been provided in relative proportions to maintain the electrolytes in the extracellular fluid of the animal at substantially maximum values as expressed in the table above, it being understood, of course, that a sufficient amount of the electrolyte composition must be fed to the animal daily in order to assure maintenance of the stipulated principal ions at normal maximum physiological levels. The best results are obtained by providing the electrolytes in a balanced formulation as set forth wherein the compounds are present in amounts balanced between the minimal and maximal tolerances for these substances and correlated with the rates of absorption of the compounds through the walls of the gastrointestinal tract of the animal, but it is to be emphasized that these values may be altered without departing from the concepts of the present method, particularly where increased total amounts of the electrolyte composition are administered to the animal. Thus, assuming that larger quantities of the electrolyte composition are fed to the animal than recommended hereinafter, the animal's system will receive excessive quantities of certain of the electrolytes, but this will still not materially affect maintenance of the sodium, potassium, calcium, magnesium, chloride and bicarbonate ions in the animal's extracellular fluid, at required maximum levels. Any excesses of the ions over and above that required to maintain the stipulated principal ions at required maximum values will simply be excreted from the animal's system through the normal excretory channels. The quantities of the individual electrolytes of course should be below the toxic levels of the same, and also below those proportions which would adversely affect the normal ionic balance between the extracellular and intracellular fluids.

When the term "bicarbonate" is used herein, it is intended to mean the bicarbonate ion or the equivalent amount of material capable of yielding that quantity of bicarbonate ion under metabolic conversion within the animal's system.

*Experiment 1*

Tests conducted on two lots of cattle, each containing 34 head, one of which was designated as a control group and the other supplied with an electrolyte composition as specified above, gave the following results:

|  | Control | Electrolyte NB-8-100-7 |
|---|---|---|
| Number head | 34 | 34 |
| Gross shipping weight, lbs | 37,339 | 37,120 |
| Net shipping weight (4%), lbs | 35,846 | 35,635 |
| Off truck weight, 270 miles, lbs | 35,170 | 35,082 |
| Shipping shrink, percent | 5.81 | 5.49 |
|  |  | −0.32 |
| Hot carcass weight, lbs | 21,837 | 21,744 |
| Packer's chilled carcass weight 2% shrink basis, lbs | 21,400 | 21,309 |
| Apparent carcass yield, percent | 59.70 | 59.80 |
| Diff. from control, percent |  | +0.10 |
| Chilled carcass weight, 48-hr. shrink basis, lbs | 21,481 | 21,409 |
| Cooler shrink, actual, percent | 1.63 | 1.54 |
| Diff. from control, percent |  | −0.09 |
| Actual carcass yield, percent | 59.92 | 60.08 |
| Diff. from control, percent |  | +0.16 |
| Recapped sales weight, approx. 120 hours in cooler, lbs | 21,324 | 21,316 |
| Cooler shrink, recap basis, percent | 2.35 | 1.97 |
| Diff. from control, percent |  | −0.38 |
| Total cooler shrink, lbs | 513 | 428 |
| Shrink cost at 43¢/lb | $220.59 | $184.04 |
| Diff. from control/load |  | $36.55 |
| Diff. from control/head |  | $1.08 |

These tests show that animals treated with electrolytes of balanced formulation endured transportation for a distance of over 280 miles, better than those receiving sodium chloride alone, but otherwise had received the same feed, water supply and treatment. The animals receiving the electrolyte composition lost less weight because more water was retained intracellularly as indicated by less cooler shrinkage of the carcasses obtained from the animals receiving the electrolyte composition. The animals supplied with the electrolyte formulation retained all or substantially all of the intracellular fluid in the tissues thereof, while the control animals which did not have access to the electrolyte composition lost intracellular water.

*Experiment 2*

Yearling steers were selected which had previously been fed on all-concentrate rations with barley, oats, milo, or beet pulp pellets making up the major feed ingredient of each ration, respectively. At the end of the feeding trial, the steers were randomly divided into three groups, so that each group contained 4 steers fed barley, 4 steers fed oats, 4 steers fed milo, and 2 steers fed beet pulp pellets. They were continued on their respective rations with the following additives: Control group—1% salt; Group A—2% by weight of the preferred electrolyte composition set forth above; and Group B—1% by weight of the preferred electrolyte composition to ½% salt.

Calculated in ratios of:

| Group | NaCl:KCl:MgCO₃:Ca lactate | NaCl:Other electrolytes |
|---|---|---|
| Control [1] | 1:0 :0 :0 | 1:0 |
| A [2] | 1:0.408:0.032:0.224 | 1:0.66 |
| B [3] | 1:0.204:0.016:0.112 | 1:0.33 |

[1] Same figures express percentages in feed.
[2] In percentages, these figures are to be doubled.
[3] In percentages, these figures are to be halved.

The additives were mixed with the respective rations each day and fed so that feed was in front of the animals at all times. Water and feed were available right up to the time of shipping.

The steers were individually weighed at 5:30 a.m., allowed to intermingle by treatment and randomly loaded into trucks. They were hauled 425 miles and were enroute approximately 14 hours. Upon arrival at the slaughterhouse, they were individually weighed and held overnight with access to water only.

The table below gives the in-transit shrink, overnight shrink, and total shrink from feedlot to slaughter. These values are reported for each electrolyte treatment, feed treatments within electrolyte treatments, by feed treatments irrespective of electrolyte treament, and for all steers in the study.

| Groups | Control total, percent | A, percent | B, percent |
|---|---|---|---|
| In transit shrink | 4.33 | 4.61 | 4.45 |
| Overnight shrink | 3.07 | 1.40 | 1.44 |
| Total shrink | 7.27 | 5.94 | 5.82 |

These data mean that a 1000 lb. steer receiving 2% electrolyte composition in its ration would weight 14.5 lbs. more at slaughter than a 1000 lb. control steer that received the customary 1% NaCl in his ration. Accordingly, all other factors being equal and figuring beef at $25.00/cwt., the steer receiving the electrolyte composition for 6 days would gross $3.62 more than the control steer; which, after deducting $1.32 for the cost of the electrolytes, leaves a net profit increase of $2.30. If only 1% electrolyte composition is used, the profit increase would amount to even more—$2.665 (13.3 lbs. more weight at 25¢, less 66¢ for electrolytes).

*Experiment 3*

Tests were also conducted on yearling steers which had been fed the same type of ration specified above. These steers, designated Groups C and D, received the following amounts of salt and electrolytes, calculated as ratios of:

| Group | NaCl:KCl:MgCO₃:Ca lactate | NaCl:Other electrolytes |
|---|---|---|
| Control [1] | 1:0 :0 :0 | 1:0 |
| C [1] | 1:1.02 :0.08 :0.56 | 1:1.66 |
| D [1] | 1:0.102:0.008:0.056 | 1:0.166 |

[1] Same figures express percentages in feed.

The results for Group C were also better than those of the controls but Groups D gave less satisfactory results, apparently because the feed was oversalted. Had small amounts of salt and electrolytes been given to the steers in Group D, the results, no doubt, would have been better.

*Experiment 4*

Twelve hundred fat lambs were sorted out of a flock of 4000. These 1200 were randomly divided into two groups. One group of 400 was given its regular ration with unmedicated water. The other 800 were given their regular ration but also received 1 oz. electrolyte composition for each 5 gallons in their drinking water for 4 days prior to shipping.

The lambs receiving plain water had a dressing percentage of 49.3%, while the ones receiving the electrolytes had a dressing percentage of 50%. These lambs were sold on a basis of dressed weight, which, when averaged out (at $18.00/cwt.), gave an average per head price advantage of 35.2¢. After deducting 2.5¢/head for the cost of electrolytes, it left the rancher with an increased net profit of 32.7¢/head.

| Data | Avg. pre-shipment weight minus 5% (normal shrinkage [1]), lbs. | Avg. double the dress weight,[2] lbs. | Gain or loss over the usual 5% shrinkage, lb. |
| --- | --- | --- | --- |
| (Plain water) 400 group | 104.6 | 103.1 | −1.5 |
| (Electrofin) 800 group | 103.5 | 103.9 | +0.4 |

[1] This is the customary shrinkage loss which is deducted by packer buyers in some areas when they buy lambs on the ranch.
[2] In this particular instance, the packer buys lambs and pays for double the dressing weight.

The main source of water and electrolyte loss from the animals' body fluids during marketing of the animals occurs by virtue of discharge of the water and electrolytes from the gastrointestinal tract. Sodium and chloride ions are lost from the extracellular fluid space, while potassium, magnesium and calcium pass outwardly from the interior of the cells and the animals' bones. It can therefore be seen that sodium chloride solutions and other mineral compositions do not compensate for the electrolyte loss. Furthermore, the electrolytes should be supplied in proportions sufficient to assure maintenance of the ions in the extracellular fluid at optimal physiological concentrations, since the intracellular fluids' composition cannot be changed directly but only via that of the extracellular compartment.

It is well known that hormones, vitamins, enzymes, trace elements, amino acids and possibly other factors play a role in the extremely complex physiological processes occurring in an animal's body. However, it is believed that none of these factors can fulfill its purpose fully unless an optimal amount of the principal ions and water are present in the intracellular fluid. The water content and electrolyte ion concentration of the cells are interdependent. A deficiency of electrolyte ions in the extracellular fluid, usually traceable to the availability of excessive and thereby normally unlimited amounts of sodium chloride, causes an excess of the normally lower level of the sodium ions in the interstitial fluid which in turn causes water to flow out of the cells through the walls thereof, because of a change in osmotic pressure between the intracellular fluid and the extracellular fluid. Thus, in order to prevent or treat cellular dehydration, it is necessary to make available an electrolyte composition of predetermined constituency and preferably of balanced relative concentrations to remedy the dehydration syndrome. Supply of sodium chloride alone to the animals would not overcome the dehydrated state of the animals' tissues and particularly not materially increase the intracellular water content of the animals' cells in a relatively short period of time. It is especially important to supply those ions to the animals which physiologically counteract the presence of an excess quantity of sodium ions, with potassium ions being the most useful in this respect, although it is believed that the magnesium and calcium ions are also of significance. In the absence of proper balance of ions in the intracellular fluid, an accelerated cell dehydration reaction sets in because of the kidney tubules secretion of potassium ions from the cells in excess of secretion of sodium ions. This reaction initiates a fall in the osmotic pressure between the cellular fluids and the extracellular fluids, resulting in an even greater flow of intracellular fluids from the individual cells. Thus it is extremely important to prevent escape of potassium ions from the cells of the animal's tissue to prevent dehydration of the cells and thereby causing an adverse effect on the quality of the meat obtained from such animals.

To overcome a potassium imbalance or deficiency or to raise the level of the magnesium ions in the cells to an optimal concentration takes longer than the time required to bring additional sodium ions into the extracellular fluids and to have the excess of such ions passed out of the body. Therefore, it has been found advantageous to supply a complete and preferably balanced electrolyte composition to the meat producing animals for a period of at least 3 days prior to killing of such animals and preferably for 5 days or longer preceding slaughter thereof in order that the electrolyte composition of the cells is returned to and maintained at optimum levels.

Provision of an excess of sodium chloride is not the answer to the problem of cell dehydration for another important reason inasmuch as the salt only makes the animal more thirsty and causes it to drink an excess of water, which will not be retained intracellularly but usually is eliminated by virtue of the resulting diarrhea which commonly occurs. Thus, electrolyte ion imbalance and cell dehydration are aggravated and this can be overcome only by supplying the animal with balanced electrolytes instead of sodium chloride.

Addition of trace elements to the electrolyte composition can be of benefit where the meat producing animals have been raised in an area deficient in one or more of the trace elements, or the animals are fed natural or commercial feeds which have been grown in geographic regions where the soil is deficient in certain of the trace elements. For this reason, utilization of trace elements in conjunction with the specified electrolytes is of value only under special conditions of trace element deficiency and for producing a meat product of preferred characteristics.

A slight deficiency of any of the electrolytes in the body fluids and particularly the extracellular fluids, since the intracellular liquid is not accessible, can cause, percentagewise, a relatively great imbalance. This imbalance, expressed in minute amounts if brought into ratio to the animal's weight, may initially seem insignificant, but, in fact, the electrolyte balance is extremely important in preventing tissue shrinkage of the animal. The present method of supplying the animal with electrolyte compounds preferably in the form of a balanced composition, is of great economical importance because of the reduction in loss of cell water during feeding, shipping, slaughter, chilling and frozen storage of the meat products and also resulting in improved meat quality due to improved cell rigidity and elasticity and thereby retention of a maximum quantity of water in the cells to assure juiciness and tenderness of the meat. In passing from the living condition to the post-mortem state, the tissues of the animal's body undergo several important compositional changes which have an effect on the tenderness of the meat. The most profound change is related to the integrity of the cell membranes and thereby the ability of the individual cells to retain maximum quantities of water therein. Since some loss of water from the cells is unavoidable when the carcass is dressed and because of failure of the integrity of the cell membranes, it can be recognized that if the intracellular water of the animal tissue is low at the time of slaughter of the animal, the final content of water in the muscle tissues, percentagewise, is less than if the cells were completely filled with water at the time of slaughter of the animal. For this reason, it can readily be appreciated that maximum juiciness and tenderness of the meat products can be obtained only by assuring cellular structure completely filled with water at the time of slaughter of the animals and which minimizes shrinkage of the carcasses during dressing and processing of the same.

Experiment 5

Another test with cattle receiving the subject electrolyte composition in drinking water for one week prior to slaughter gave the results set forth in the table below.

|  | Avg. wt. per head | Total wt. | Increase or loss | Avg. percent of shrink |
|---|---|---|---|---|
| Animals receiving electrolyte composition in drinking water: | | | | |
| Wt. into stockyards, lb | 959½ | 25,907 | | |
| Wt. out of stockyards, lb | 988 | 26,680 | +773 | |
| Wt. off truck, lb | 975½ | 26,340 | −340 | |
| 7 day cooled wt | | | | 1.29 |
| Control animals: | | | | |
| Wt. into stockyards, lb | 1,052 | 27,350 | | |
| Wt. out of stockyards, lb | 1,075 | 27,950 | +600 | |
| Wt. off truck, lb | 1,054 | 27,410 | −540 | |
| 7 day cooled wt | | | | 1.42 |

Six home economists expert in the art of tasting meat products, tasted the meat of the animals used in the above test. Comparable portions were broiled at the same time; one done rare, one medium, one well done. Of the six tasters, the following numbers gave preference to the meat from the animals receiving the electrolyte composition:

|  | Medium rare | Well done |
|---|---|---|
| Color | 3 | 1 |
| Flavor | 4 | 2 |
| Juiciness | 3 | 0 |
| Shrinkage | (¹) | 0 |
| Tenderness | 6 | 5 |

¹ No difference.

The medium-rare steaks from the animals receiving the electrolyte composition were superior to the steaks from the control animals, while for well-done steaks from the animals supplied with the electrolyte composition, only tenderness was far superior. On the other hand, the rare steaks from the control animals were found in the taste test in all respects superior, but one person gave tenderness preference to the rare steak from an animal receiving the electrolyte composition.

For purposes of supplying the balanced electrolyte composition in the feed of animals, best results have been obtained by incorporating the formulation set forth above in the normal feed ration of the animal in predetermined proportions based on the amount of sodium chloride which has heretofore generally been recommended as being advantageous when introduced into the animals' feed or already present therein as commercially prepared or produced. The amount of sodium chloride previously incorporated in feed rations for animals varied from about ¼% to approximately 2% by weight of the total ration and depending upon the type of animal being fed. It has been suggested that from 1% to 1½% by weight of sodium chloride be added to the feed of beef cattle, about 2% by weight of sodium chloride into the feed for swine and approximately ½% by weight of sodium chloride be added to poultry feed.

Based on these figures, it is to be preferred that for each 1% by weight of sodium chloride in the feedstuff, from 0.01% to 2% by weight of the other electrolytes containing potassium, magnesium and calcium be added. Thus, in calculating the proportion of the electrolyte composition defined, to be introduced into the feedstuff, a determination will have to be made as to the amount of sodium chloride which may already have been added to the feedstuff in the preparation thereof by a commercial producer. In the absence of addition of sodium chloride to the feedstuff, the electrolyte composition may be added in proper amount to provide the desired amount of sodium chloride as has been conventionally used in the past. The relative ratios between the electrolytes of the formulation should be of the values defined. Best results have been obtained by utilizing from 0.2% to 1.5% by weight of the other electrolytes containing the cations, potassium, magnesium and calcium for each 1% of sodium chloride in the feedstuff. Based on the figures above, a specific example involves the addition of about 2½% by weight of the electrolyte formulation set forth including sugar and Santocel C, substituted for each 1% by weight of sodium chloride alone which has been recommended for introduction into a particular animal's feed ration. Further examples may be set forth such as, for feeder cattle, up to about 2 ounces of the electrolyte composition may be added to each animal's feed ration, with ½ of the material being supplied in the morning ration and ½ in the evening ration. Very favorable results have been obtained in some tests, when the balanced electrolyte formulation was given in replacement for the customary NaCl amount at the ratio of 1 part active ingredients of electrolytes for 1 part of the NaCl formerly used alone. Furthermore, for each 0.4 part by weight of elemental Na, it is preferred that from 0.054 to 0.54 part of elemental K, from 0.002 to 0.02 Mg and from 0.007 to 0.07 part of elemental Ca be provided.

In lieu of introduction of the dry powdered electrolyte composition into feedstuffs, the electrolyte material may be dissolved in the water which is normally consumed by each of the animals during a 24-hour period, and it has been found desirable to utilize 1 part of the electrolyte composition in each 333 to 3,330 parts of water. Best results have been obtained by using a dilution of 1 part by weight of the electrolyte composition to each 1,666 parts by weight of water. Thus, for each gallon of solution, about 8.4 grains of elemental Na, 4.5 grains of elemental K, 0.17 grain of elemental Mg and 0.62 grain of elemental Ca should be provided, all expressed as ionic parts. Although the concentration of electrolytes in the drinking water supplied to the animal is optimum to produce the most beneficial results, the actual amount of electrolytes consumed by a given animal during each 24-hour period necessarily varies. For example, the amount of drinking water needed by a particular animal will depend upon its species, the level of production, the environmental temperature, the water content of the animal's feed, and the type of ration that is fed. Under average conditions, cattle will drink from 5 to 8 pounds of water daily for each 100 pounds of body weight, with somewhat greater quantities being consumed by younger as well as lactating animals. Swine will average about 4 pounds of water per pound of feed and poultry approximately 2 to 3 pounds of water per pound of feed. It can be recognized that when the ambient temperature is above 80° F., water requirements will rise rapidly.

When the balanced electrolyte composition is to be supplied in the form of lick salt, the sodium chloride content of the block should preferably be in the range of 45% to 95%, with the optimum being within the range of 80% to 85%. The remaining part of the salt block is the other electrolyte compounds in the relative ratios specified.

Having thus described the invention, what is claimed as new and desired to be secured by Letters Patent is:

1. A method of increasing the tenderness and customer acceptability of food products obtained from a meat producing animal comprising supplying the animal with a diet including a normal amount of Na ions and an electrolyte composition having K, Mg and Ca ions therein, said composition being supplied to the animal in conjunction with said Na ions for a predetermined, relatively short period immediately prior to slaughter thereof and with from 0.134 to 1.34 parts of elemental K, from 0.005 to 0.05 part of elemental Mg and from 0.0183 to 0.183 part of elemental Ca being provided for each 1 part of elemental Na, all expressed as approximate ionic parts by weight.

2. A method as set forth in claim 1 wherein said period is of at least approximately 3 days duration.

3. A method as set forth in claim 1 wherein said period is of at least approximately 5 days duration.

4. A method of increasing the tenderness and customer acceptability of food products obtained from a meat producing animal comprising supplying the animal with a diet including a normal amount of NaCl and an electrolyte composition having KCl, MgCO₃ and $$CaOOCHOCHCH_3 \cdot 5H_2O$$

therein, said composition being supplied to the animal in conjunction with said NaCl for a predetermined period immediately prior to slaughter thereof and with from 0.102 to 1 part of KCl, 0.008 to 0.08 part of MgCO₃ and from 0.056 to 0.56 part of $CaOOCHOCHCH_3 \cdot 5H_2O$ being provided for each 1 part of NaCl, all expressed as approximate parts by weight.

5. A method as set forth in claim 4 wherein said NaCl and the electrolyte composition are supplied to the animal in a food ration and wherein the amount of NaCl is within the range of approximately ¼% to about 2% by weight of said ration.

6. A method as set forth in claim 4 wherein said NaCl and the electrolyte composition are supplied to the animal in its drinking water and wherein 1 part by weight of the electrolyte composition and NaCl in combination are provided for each 333 to 3,330 parts of water consumed by the animal.

7. A method as set forth in claim 4 wherein said NaCl and the electrolyte composition are supplied to the animal in its drinking water and wherein 1 part by weight of the electrolyte composition and NaCl in combination are provided for each 1,666 parts by weight of water consumed by the animal.

8. A method as set forth in claim 4 wherein said electrolyte composition is incorporated into lick salt prior to being included in the diet of the animal.

9. A method of increasing the tenderness and customer acceptability of food products obtained from a meat producing animal comprising supplying the animal with a diet including an electrolyte composition having NaCl, KCl, MgCO₃ and $CaOOCHOCHCH_3 \cdot 5H_2O$ present therein in respective relative proportions expressed as approximate parts by weight of 40:16.3:1.3:9.0, said electrolyte composition being supplied to the animal at an effective concentration and for a predetermined, relatively short period immediately prior to slaughter thereof.

10. A method of increasing the tenderness and customer acceptability of food products obtained from a meat producing animal comprising supplying the animal with an electrolyte composition dissolved in water and wherein the electrolytes are present in respective relative proportions providing for each 1 gallon of solution, about 8.4 grains of elemental Na, 4.54 grains of elemental K, 0.17 grain of elemental Mg, 0.62 grain of elemental Ca, said solution being supplied to the animal for a predetermined, relatively short period immediately prior to slaughter thereof.

References Cited by the Examiner

UNITED STATES PATENTS

| 2,512,537 | 6/1950 | Zellers | 99—4 X |
| 2,606,839 | 8/1952 | Evans | 99—142 |
| 2,895,830 | 7/1959 | Roe. | |

HYMAN LORD, *Primary Examiner.*

A. LOUIS MONACELL, *Examiner.*